United States Patent [19]

Waitkus

[11] Patent Number: 5,034,497

[45] Date of Patent: Jul. 23, 1991

[54] THERMOSETTING COMPOSITIONS AND MOLDING METHOD

[75] Inventor: Phillip A. Waitkus, Sheboygan, Wis.

[73] Assignee: Plastics Engineering Company, Sheboygan, Wis.

[21] Appl. No.: 402,305

[22] Filed: Sep. 5, 1989

Related U.S. Application Data

[62] Division of Ser. No. 290,785, Dec. 28, 1988, Pat. No. 4,880,893.

[51] Int. Cl.$^5$ .......................... C08G 8/04; C08G 14/02
[52] U.S. Cl. ..................................... 528/129; 502/156; 502/172
[58] Field of Search ...................... 502/156, 172, 344; 528/129

[56] References Cited

U.S. PATENT DOCUMENTS 4,358,570 11/1982 Tobinaga ............................. 525/456
4,661,412 4/1987 Bornstein et al. .................. 428/426

Primary Examiner—Thurman Page
Assistant Examiner—Carlos Azpuru
Attorney, Agent, or Firm—Quarles & Brady

[57] ABSTRACT

A thermosetting resin containing composition can be heated to reduce its viscosity and used as a liquid in a liquid injection molding method. It has a phenolic resin content of about 80% to about 90% solids by weight, and contains about 5% to about 40% of a polyglycol. The composition may also contain resorcinol as a compatibilizing agent and a polyalkylene glycol as the polyglycol agent. In a novel method the resin containing composition is heated to reduce its viscosity and introduced into a heated mold in a liquid injection molding method.

5 Claims, No Drawings

THERMOSETTING COMPOSITIONS AND MOLDING METHOD

This is a division of application Ser. No. 07/290,785, filed Dec. 28, 1988, now U.S. Pat. No. 4,880,893.

FIELD OF THE INVENTION

The invention relates generally to thermosetting resins. More particularly, it relates to composition containing phenolic resins and a method for their use in injection molding.

BACKGROUND OF THE INVENTION

Thermosetting compositions, such as phenolic resins, have been known for many years and have been used in many applications because they have high heat resistance; they are light weight; they have excellent dimensional stability and they have very low flammability. The usual method for preparing thermoset molding compounds involves blending the resin with fillers, pigments and other additives, followed by compounding and granulating. The granulated resin compositions are then fabricated by any of the known methods such as compression, transfer, or injection molding.

Recently, there have been developed new fabrication methods in which liquid thermosetting resin compositions are injected directly into a mold where curing takes place, resulting in the formation of a fabricated part. Depending on the process steps and the nature of the compositions, these methods are known as liquid injection molding (LIM), reaction injection molding (RIM), or resin transfer molding (RTM). Liquid thermosetting resins also may be employed in sheet-molding compound (SMC) or pultrusion (PT) processes.

The liquid injection molding processes are fast and adaptable to high speed production requirements, and since the curing reaction is generally exothermic, these processes are less energy intensive than the usual methods for processing thermosetting resins. In addition, liquid injection offers the potential of precise orientation of reinforcing fibers in the mold prior to injection of the resin. This allows the production of parts with maximized strength to achieve engineering objectives. However, attempts to use these processes in the fabrication of products using conventional phenolic resins have not been completely successful because of the excess shrinkage of low solids content resins, and the residual unbound water and volatile organic impurities which may be present in the resins.

The presence of excess water and/or volatile organic compounds in the resins can result in problems by causing undesirably high mold pressure and formation of voids or bubbles in the formed composite, resulting in a loss of clarity and strength of the resin composite. Thus, many lower solids content, phenolic thermosetting compositions are unsuitable for liquid injection processes.

Attempts to use high solids content phenolic resins also have been relatively unsuccessful because of the high viscosity of such resins and the presence of voids in the formed composite. The high viscosity of such resins, many of which are solid or nearly solid at room temperature, necessitates high shear mixing with any reinforcing material and injection into the mold under high shear conditions. This can result in significant attrition of the reinforcing material, thus lowering the strength of the final composite. Such premixing also precludes the use of resin transfer molding. The high viscosity of such resins also impedes sufficient wetting of the reinforcing material and adequate mixing with the reinforcing material. The end result is usually products which have poor physical properties, including areas in which there is separation of the resins from the reinforcing materials.

As previously described, phenolic resins are known for their high temperature mechanical strength, low flammability resistance and solvent resistance. Therefore, it would be highly desirable to have phenolic resin composition that do not possess the above described disadvantages and could be used in liquid injection molding methods.

BRIEF SUMMARY OF THE INVENTION

The primary objects of the present invention are to disclose novel liquid injection molding compositions having high solids content of phenolic thermosetting resins and an improved method of liquid injection molding using such compositions.

The novel compositions of the present invention contain from about 80 percent to about 90 percent solids by weight of a phenolic resin having a formaldehyde to phenol ratio of about 1.0:1 to 2:1 and an effective amount, about 5 percent to about 40 percent by weight, of a polyglycol which reduces bubbles or voids and improves clarity and strength of the finished product. The compositions may also contain an effective amount of a compatibilizing agent, such as a reactive phenol, which reduces the amount of acidic catalyst required and improves curing time. The novel compositions have a viscosity of about 200 centipoise to about 10,000 centipoise at a temperature of about 80° C.

Molded products formed by the curing of the compositions of the present invention are clear and relatively free of voids. In addition, if a compatibilizing agent, such as a reactive phenol (e.g. resorcinol) is included less acidic catalyst can be employed. Thus, the finished products will have less residual acidity and corresponding corrosiveness.

In the preferred method, a novel composition of the present invention is heated to a temperature which causes a reduction in viscosity which allows the composition to be injected or transferred into a heated mold which may contain filler. Preferably, the compatibilizing agent and catalyst are dissolved in the polyglycol and the resulting mixture added to the liquid resin component prior to injecting the composition into the heated mold. The composition is then cured with or without added heat.

The phenolic resin resole component of the compositions of the present invention may be any conventional phenolformaldehyde resin resole which has a formaldehyde to phenol ratio of 1.0:1 to 2:1, preferably about 1.15 to 1.4:1, and which is curable to a solid crosslinked phenol-formaldehyde solid resin. The resin resole should be one that can be liquified to a suitable viscosity by heating and which will remain at a suitable viscosity for the required time under the molding conditions. Suitable resin resoles are disclosed in U.S. Pat. No. 3,485,797, issued to Robins on Dec. 23, 1969.

The formaldehyde ingredient of the preferred resin resole may be introduced to the reaction mixture as aqueous formaldehyde solution or as paraformaldehyde. Although the preferred resin contains formaldehyde, it is well known in the art that other aldehydes such as acetaldehyde, propionic aldehyde, butylaldehyde and furfural can be substituted for formaldehyde in phenol-formaldehyde type resins. However, in order that hydroxymethyl groups can form, some formaldehyde should be present in the reaction mixture wherein the compositions of the invention are formed. At least 20 mole percent formaldehyde, based on the total moles of aldehyde used, should be sufficient formaldehyde to form the hydroxymethyl groups.

The phenols suitable for use in the resin component are phenol per se, substituted phenols and mixtures thereof. Preferably the mixtures contain phenol. Suitable phenols can be represented by the formula;

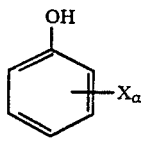

where X and a are defined above, and wherein at least two of the ortho- and para-positions relative to the hydroxy group are free. Most preferably the substituents should be in the meta-positions only, leaving the ortho- and para-positions free. Examples of suitable substituted phenols are cresols, isopropylphenols, nonylphenols or dihydric phenols, such as bis-phenol A, bis-phenol F, hydroquinone and resorcinol. Use of substituted phenols will tend to alter the properties of any resulting phenolic resin which is derived from the resulting product, such property changes being of the kind which allows for a maximum variety of phenolic resin product types. For example, a halogen substitution will enhance the flame retardancy of the resultant phenolic resin. Also a diphenol such as bisphenol A has an additional phenolic hydroxy group, providing another site for hydroxymethyl group or methylol group production.

The total aldehyde to total phenol molar ratio should be from about 1.0:1 to 2:1, preferably 1.1:1 to 1.4:1.

The preferred polyglycols are polyethylene glycol and polypropylene glycol. They can be added in amounts ranging from about 5% to about 40% by weight without reducing the clarity hardness of the molded part. The exact concentration, of course, depends upon the resin and projected water content. In a preferred embodiment, the percent of polyglycol will be from about 5% to about 30% by weight. The polyglycol improves the translucency of the finished product presumably by nullifying the effects of any residual water that is present. It is believed that the polyglycol helps compatibilize the water with the resin which grows increasingly incompatible as it goes toward complete cure.

Also, if desired, there may be added to the resin resole other types of polymers which can co-cure with these reactive compositions. Examples of co-reactive polymers are phenol-formaldehyde resoles, and phenol-formaldehyde novolacs of either the high ortho or nominal ortho content. The use of these additives serves either to modify the properties of the cured product or the handling characteristics of the prepolymer.

The reinforcing materials or fillers suitable for use in the novel compositions of the present invention include those typically used in the manufacture of reinforced composites, such as glass fibers, carbon fibers, graphite fibers, ceramic fibers, wollastonite, cellulosic fibers such as wood flour and the like, organic fibers such as aromatic polyamide fibers, and mica. The preferred reinforcing materials are glass fibers, carbon fibers, graphite fibers and aromatic polyamide fibers.

Products can be made by any of the liquid injection molding processes, such as LIM, RIM, RTM or PT. The RTM and PT methods, are especially preferred.

In one modification of the pultrusion method, the reinforcing material is introduced into a heated mold, the novel composition is liquified by heating and injected into the mold and cured. The finished product is pulled from the mold using the reinforcing material.

The preferred compositions also contain a compatibilizing agent, such as a reactive phenol derivative, which is capable of reducing the amount of acid catalyst and/or curing temperature. Resorcinol which is non-acidic and noncorrosive to molds is especially preferred. The resorcinol may be used in an amount ranging from 2% to about 30% by weight of the resin. Especially preferred is an amount of resorcinol of about 5% to 15%. Resorcinol containing novolacs and resorcinol containing resoles may be used in some instances in place of pure resorcinol. Other reactive phenol derivatives that can be employed include pyrogallol, catechol, m-aminophenol and m-cresol.

In general, although non-acidic catalysts are preferred, all those catalysts which are commonly employed for the cure of phenol-formaldehyde resins can be used to cure the novel composition. Typical acid catalysts are sulfuric acid, sulfonic acids such as phenolsulfonic acid, oxalic acid, boron trifluoride, boric anhydride, boric acid and mixtures of boric acid or boric anhydride with epoxies. Latent catalysts also can be used and include certain phenyl esters of carboxylic acids that form upon cure a carboxylic acid having a pKa of 2 or less. Also included are sulfur dioxide containing compounds that generate sulfur dioxide at cure conditions. Examples of latent catalysts include phenyl hydrogen maleate, phenyl trifluoroacetate and butadiene sulfone. Additional basic catalysts are the organic amines such as hexamethylenetetramine, trimethylamine, ethanolamines and oxides and hydroxides of metals such as barium, calcium, sodium and potassium.

The compatibilizing agent and catalyst can be dissolved in the polyglycols and the mixture introduced into the liquid resin component immediately before injection into the mold.

The concentration of the catalyst depends on cure rate required and acid or base strength of the catalyst. For a strong acid such as sulfuric acid, the typical concentration is from 0.01 weight percent to 5 weight percent. For weaker acids or bases concentrations as high as 10–15 weight percent can be employed The latent catalysts are typically used in an amount from about 0.2 to about 10 weight percent, preferably about 0.5 to about 5 weight percent. The basis of the percentages is the weight of the catalyst free resin. Due to the ease of obtaining a homogeneous polymerizing mixture, catalysts soluble in the liquified resin of the invention are preferred.

The compositions of the present invention may be cured by the application of heat. The curing temperature can be the same or lower than the temperature of the injected composition provided it remains liquid long enough for the molding process. Usually a curing temperature of about 100° C. to about 200° C. is employed. The curing time can be regulated by type and concentration of the catalyst and will vary depending on such factors as the particular composition of the thermosetting resin, the fabrication process, the configuration of the cured part and other factors known to those in the art. When used in liquid injection molding applications, the cure time is generally from about 1 to about 10 minutes.

The following examples serve to further illustrate the invention. Examples 1 to 6 describe the preparation of high solids content phenolic resin components; Example 7 describes the preparation of prepregs of resin and filler; Example 8 describes efforts to optimize the concentrations of the resorcinol and the polyglycol; Example 9 describes the preparation of a prepreg using the compositions of the present invention; Example 10 describes the use of sodium hydroxide as the catalyst; and, Example 11 illustrates the method of the present invention. The examples are not intended to limit the invention in any way.

In the examples, the following standard evaluation procedures were employed:

| Flexural Modulus | ASTM D790 |
| --- | --- |
| Flexural Strength | ASTM D790 |
| Notched Izod (Impact) | ASTM D256 |
| Heat Deflection Temperature (HDT) | ASTM D648 |
| Tensile Modulus | ASTM D638 |
| Tensile Strength | ASTM D638 |
| Elongation | ASTM D638 |

Example 1

The Manufacture of High Solids Content Phenolic Resin Mole Ratio 1.266 Moles Formaldehyde/Mole of Phenol Into a 4 liter stainless steel resin flask, equipped with a stirrer, reflux condenser and thermometer, was charged 1500 grams (15.96 moles) USP phenol, 1170 grams (20.2 moles) 52% formaldehyde, and 120 grams of 25% tetramethylammonium hydroxide in water. The solution was stirred and heated to 90° C over a period of 46 min. The batch was then held at 90° C for 1 hr. At the end of this period, the reflux condenser was exchanged for a vacuum distillation condenser and receiver and 28" of vacuum slowly applied. The batch was then distilled at 28" of vacuum to a batch temperature of 80° C. The distillation phase required 3 hrs 15 min. The resin was then cooled to room temperature and discharged. Measurement of the resins' properties yielded the following results:

| Yield in grams | 2055 |
| --- | --- |
| Viscosity, Brookfield, cps, 25° C. | 7750 |
| Specific Gravity, 25° C. | 1.184 |
| Solids Content, 3 hrs @ 135° C. | 82.6% |
| Moisture Content, % | 1.58 |
| Free Formaldehyde in the Resin, % | 1.55 |
| Number Average Molecular Weight | 139 |
| Weight Average Molecular Weight | 173 |

Example 2

The Manufacture of High Solids Content Phenolic Resin Mole Ratio 1.639 Moles Formaldehyde/Mole of Phenol Into a 4 liter stainless steel resin flask, equipped with a stirrer, reflux condenser and thermometer, was charged 1500 grams (15.6 moles) USP phenol, 1500 grams (26 moles) 52% formaldehyde, and 120 grams of 25% tetramethylammonium hydroxide in water. The solution was stirred and heated to 90° C. over a period of 50 min. The batch was then held at 90° C. for 1 hr. At the end of this period the reflux condenser was exchanged for a vacuum distillation condenser and receiver and 28" of vacuum slowly applied. The batch was then distilled at 28' of vacuum to a batch temperature of 80° C. The distillation phase required 3 hrs 20 min. The resin was then cooled to room temperature and discharged. Measurement of the resins' properties yielded the following results:

| Yield in grams | 2280 |
| --- | --- |
| Viscosity, Brookfield, cps, 25° C. | 29200 |
| Specific Gravity, 25° C. | 1.212 |
| Solids Content, 3 hrs @ 135° C. | 84.7 |
| Moisture Content % | 1.64 |
| Free Formaldehyde in the Resin, % | 3.15 |
| Number Average Molecular Weight | 160 |
| Weight Average Molecular Weight | 243 |

Example 3

The Manufacture of High Solids Content Phenolic Resin Mole Ratio 2.03 Moles Formaldehyde/Mole of Phenol Into a 4 liter stainless steel resin flask equipped with a stirrer, reflux condenser and thermometer, was charged 1500 grams (15.96 moles) USP phenol, 1866 grams (32.3 moles) 52% formaldehyde and 120 grams of 25% tetramethylammonium hydroxide in water. The solution was stirred and heated to 90° C. over a period of 46 min. The batch was then held at 90° C. for 1 hr. At the end of this period the reflux condenser was exchanged for a vacuum distillation condenser and receiver and 28" of vacuum slowly applied. The batch was then distilled at 28" of vacuum to a batch temperature of 80° C. The distillation phase required 3 hrs 15 min. The resin was then cooled to room temperature and discharged. Measurement of the resins' properties yielded the following results:

| Yield in grams | 2345 |
| --- | --- |
| Viscosity, Brookfield, cps, 25° C. | 63500 |
| Specific Gravity, 25° C. | 1.259 |
| Solids Content, 3 hrs @ 135° C. | 85.5 |
| Moisture Content, % | 1.79 |
| Free Formaldehyde in the Resin, % | 5.81 |
| Number Average Molecular Weight | 177 |
| Weight Average Molecular Weight | 280 |

Example 4

The Preparation of a Solid Resole Resin

Into a 4 liter stainless resin kettle, equipped with an anchor agitator, reflux condenser and thermometer, was added 1500 grams (15.96 moles) phenol, 1200 grams (20.8 moles) 52% formaldehyde. To this solution was then added 7.0 grams (0.175 mole) of caustic soda and 22.9 grams (0.164 mole) of hexamethylenetetramine. This mixture was brought to 90° C. over a period of 40 min and maintained at this temperature for an additional 35 min. At the end of the holding period 26" of vacuum was slowly applied. The batch was distilled at 26" of vacuum to a temperature of 90° C, at which point the vacuum was increased slowly to 28" where it was held until the viscosity, as measured by watt meter reading on the agitator drive, reached 120 watts at a speed setting of 5. The resin was then discharged to a cooling plate to cool. The yield was determine to be 1809 grams.

Measurement of the melting point of the resin, by gradient bar methods, gave a value of 170° F. and a stroke cure of 23 sec at 330° F.

Example 5

The Preparation of a Resorcinol-Phenol-Formaldehyde Novolac

Into a 4 liter stainless resin flask equipped with a thermometer, agitator, reflux condenser, and addition port, is placed 900 grams (9.6 mole) phenol, 534 grams (9.12 mole) 52% formaldehyde, 200 grams water, and 10 grams of oxalic acid dissolved in 20 grams of hot water. The pH was found to be 1.0. The mixture was then brought to 80° C. in 22 min and the heat removed. An exothermic reaction then carried the reaction temperature to 101° C. where reflux occurred. The reacting mass was held at reflux for 20 min, then cooled to 20° C. When a batch temperature of 20° C. was reached, 400 grams (3.6 mole) of resorcinol was added. The batch was then heated to 35° C. at which temperature a mild exotherm ensued raising the temperature to 70° C. over a 11 min period. Reflux was attained only upon the addition of extra heat and it was continued for an additional one-half hour. At this point, an additional 9.5 grams of oxalic acid dissolved in 19 grams of hot water was added and reflux continues for an additional 2 hrs. The excess oxalic acid was then neutralized by the addition of 7.0 grams of calcium hydroxide as a slurry in 14 grams of water, and the reaction mass distilled at atmospheric pressure to a temperature of 150° C. The resin was poured to yield 1345 grams of resin. The product was found to melt on a heated gradient bar at 184° F. and have a set time when blended with 10% hexamethylenetetramine of 7-9 seconds.

Example 6

The Preparation of a Resorcinol Based Resole Resin

Into a 4 liter stainless kettle, equipped with a reflux condenser, stirrer, thermometer and addition port, are placed 940 grams (10 moles) phenol, 105 grams barium hydroxide octahydrate dissolved in 400 grams of water, and 1385 grams (24 moles) formaldehyde 52%. The mixture was heated to 85° C. in 21 min and held for 1-hr with good agitation. At the end of this holding period 660 grams (6 moles) of resorcinol was slowly added over a 30 min period. When the addition of resorcinol was complete, 128 grams of 20% sulfuric acid was added to adjust the pH to 7.55. When the pH was reached, the reaction mixture was distilled at 28" of vacuum to 56° C. The distillation step required 2 hrs 46 min. The finished resin was discharged to a storage container and found to weigh 2354 grams. The properties we found are as below:

| | |
|---|---|
| Brookfield Viscosity @ 25° C., cps | 656,000 |
| Solids Content, 3 hrs @ 135° C. | 87% |
| Moisture Content, % | 6.5 |
| Free Formaldehyde Content, % | 0.09 |
| Set Time @ 330° C., sec | 25 |

Example 7

The Preparation of a Press Laminate of Phenolic Bonded 4533 S Glass

A solution of the solid resole from Example 4 was prepared by dissolving 500 grams of this product in 500 grams of ethanol. This solution was then used to coat 19 sheets of 4533 S-glass cloth. After each treatment the excess resin was wiped repeatedly over the surface with a rubber wiper blade to assure good penetration, and the excess wiped off. The individual sheets were allowed to dry at room temperature for 12 hrs and were then advanced by oven drying at 70° C for 1 hr. The sheets were then stacked between two polished steel sheets and molded at 500 psi for 5 min at 300° F. From the laminate so formed, tensile specimens were cut according to the dimension given in ASTM D638. These were tested according to that test and found to possess a tensile strength of 40,510 psi.

Similarly, a laminate of 27 sheets was made and molded at 800 psi for 7 min at 300° F. These were cut to standard ASTM D790 flexural strength specimen measuring ½"×⅛"×5". Testing of these specimens yielded a flexural strength of 36,981 psi. Ash testing of the broken samples showed both samples to contain 30% resin, 70% glass fabric. To attempt to determine the effect of resin loading on the strength, a separate experiment was performed in which the glass cloth was treated twice with resin and allowed to dry between resin application. In this way, the resin content of the laminate was increased to 55%. This gave a flexural strength of 34,659 psi, which was only slightly inferior to the results on the higher loading sample.

Example 8

Preparation of Test Samples to Determine Optimum Catalyst and Additive Concentrations In an effort to determine optimum concentrations of resorcinol and polyethylene oxide, it was determined to vary the polyethylene content between 0 and 25 parts per hundred weight of resin and the resorcinol concentration over the same range. As there may be a dependence of the proper amount of each additive upon the ratio of formaldehyde to phenol used in the manufacture of the resin, each resin as described in Examples 1, 2 and 3 had to be compared in the same test protocol. To achieve this, the following table which shows percents by weight was prepared:

| Parts PEG per 100 parts of resin | Parts Resorcinol per 100 Parts of Resin | | | | | | |
|---|---|---|---|---|---|---|---|
| | | 5 | | 15 | | 25 | |
| 5 | Resin | 90.90% | Resin | 83.33% | Resin | 76.92% | |
| | PEG | 4.545% | PEG | 4.1667% | PEG | 3.85% | |
| | Resorcinol | 4.545% | Resorcinol | 12.50% | Resorcinol | 19.23% | |
| 15 | Resin | 83.33% | Resin | 76.92% | Resin | 71.43% | |
| | PEG | 12.50% | PEG | 11.54% | PEG | 10.71% | |
| | Resorcinol | 4.7% | Resorcinol | 11.54% | Resorcinol | 17.86% | |
| 25 | Resin | 76.92% | Resin | 71.43% | Resin | 66.67% | |
| | PEG | 19.23% | PEG | 17.86% | PEG | 16.67% | |

| Parts PEG per | Parts Resorcinol per 100 Parts of Resin -continued | | |
|---|---|---|---|
| 100 parts of resin | 5 | 15 | 25 |
| | Resorcinol 3.85% | Resorcinol 10.71% | Resorcinol 16.67% |

As mentioned above, each of the three resins was examined in each of the nine formulations, using a catalyst consisting of a mixture of 17.5 water, 32.5% phenol sulfonic acid, and 50.0% polyethylene glycol molecular weight 200. Resin from Example 1 was prepared with the lowest mole ratio; Example 2 the intermediate mole ratio; and Example 3 the highest mole ratio.

The result will be displayed in the same fashion as above, that is, in a matrix of nine blocks. The following tables show that an increase in resorcinol content shortens gel time.

| Parts PEG per | Gel Time at 7% Catalyst @ 80° C. Resorcinol, pph | | |
|---|---|---|---|
| 100 parts of resin | 5 | 15 | 25 |
| 5 | Ex. 3  5 min | Ex. 3  <1 min | Ex. 3  — |
| | Ex. 2  5 min | Ex. 2  10 min | Ex. 2  — |
| | Ex. 1  8 min | Ex. 1  4 min | Ex. 1  — |
| 15 | Ex. 3  6 min | Ex. 3  3 min | Ex. 3  1 min |
| | Ex. 2  8.5 min | Ex. 2  5 min | Ex. 2  1 min |
| | Ex. 1  6 min | Ex. 1  3.5 min | Ex. 1  2 min |
| 25 | Ex. 3  5.5 min | Ex. 3  4 min | Ex. 3  1 min |
| | Ex. 2  4 min | Ex. 2  1 min | Ex. 2  2 min |
| | Ex. 1  10 min | Ex. 1  2.5 min | Ex. 1  3 min |

| Parts PEG per | % Acid Catalyst to Deliver 10 minute Cure @ 80° C. Resorcinol pph Resin | | |
|---|---|---|---|
| 100 parts of resin | 5 | 15 | 25 |
| 5 | 7.5% | 6% | — |
| 15 | 7% | 6% | 5.8% |
| 25 | 6.7% | 6% | 5.5% |

The tables report on the effects of resorcinol content on appearance and clarity.

| Parts PEG per | Resin Clarity of Casting at 5% Catalyst Level Resorcinol, pph | | |
|---|---|---|---|
| 100 parts of resin | 5 | 15 | 25 |
| 5 | Ex. 3 Milky | Ex. 3 Stress Cracked | Ex. 3 — |
| | Ex. 2 Milky | Ex. 2 Milky | Ex. 2 — |
| | Ex. 1 Milky | Ex. 1 Milky | Ex. 1 — |
| 15 | Ex. 3 Milky | Ex. 3 Stress Cracked | Ex. 3 Milky spots |
| | Ex. 2 Clear/ Rubbery | Ex. 2 — | Ex. 2 Clear |
| | Ex. 1 Clear | Ex. 1 Clear | Ex. 1 Clear |
| 25 | Ex. 3 Milky | Ex. 3 Stress Cracked | Ex. 3 Clear/some stress |
| | Ex. 2 Stress Cracked | Ex. 2 Milky clear | Ex. 2 Clear |
| | Ex. 1 Clear/ Rubbery | Ex. 1 Clear/some stress | Ex. 1 Clear/some stress |

| Parts PEG per | pH of Resin @ 5% Catalyst Resorcinol, pph | | |
|---|---|---|---|
| 100 parts of resin | 5 | 15 | 25 |
| 5 | 3.56 | 4.23 | |
| | 4.92 | 3.74 | |
| | 6.85 | 6.16 | |
| 15 | 3.74 | | 4.34 |
| | 4.60 | 3.90 | 3.93 |
| | 5.96 | 6.43 | 6.16 |
| 25 | 3.50 | 3.72 | 3.0 |
| | 3.76 | 2.87 | 3.64 |
| | 6.93 | 6.55 | .6.13 |

Example 9

Composite Strength Comparison

The resins prepared in Examples 1, 2, and 3 were converted into composite specimen blanks by the wet layup technique. This was done by adding 75 grams resorcinol, 25 grams polyethylene oxide molecular weight 200, and 9.75 grams of phenol sulfonic acid to 600 gms of resin. When the compounds were thoroughly mixed with the resin, 27 sheets of 4533 S-glass were layered up with the resin to prepare blanks for flexural specimens. In the preparation of tensile specimen blanks, 19 sheets of glass cloth were used. Both layups were made with 12"×12" sheets of glass cloth directly onto a waxed glass plate and a cover plate placed on top forming a sandwich of layed-up glass cloth between two glass plates. The ensemble was then placed in an oven at 80° C. overnight. In the morning the ensemble was removed, disassembled, and the composite allowed to cool. When cool, tensile and flexural specimens were cut from the appropriate blanks and conditioned as per the ASTM Test Methods D638 and D790. The specimens were then tested to give the following results:

| | Example 1 | Example 2 | Example 3 |
|---|---|---|---|
| Tensile Strength, psi | 45,712 | 24,809 | 32,307 |
| Flexural Strength, psi | 48,189 | 14,896 | 34,005 |

Example 10

Use of Sodium Hydroxide Catalyst

The procedure of Example 9 was repeated using 1% sodium hydroxide as the catalyst. The results obtained were comparable to those of Example 9.

Example 11

Molding Process

The resin compositions described in Example 9 were heated to 80° C. to reduce their viscosity and injected into a heated mold (temperature 80° C.) for a miniature boat-like structure. The compositions were cured by heating the mold to about 100° C. The finished products were relatively free of voids and comparable in strength to products made from epoxy based compositions.

It will be readily apparent to those skilled in the art that a number of modifications and changes may be made without departing from the spirit and scope of the invention. Therefore, the invention is not to be limited except by the claims.

I claim:

1. A liquid catalyst composition for use in curing a phenolic resin, said composition comprising an effective amount of a catalyst for curing a phenolic resin in a liquid containing at least about 50% by weight of a liquid polyglycol, said effective amount of a catalyst being selected from up to 5 weight percent of a strong acid catalyst up to 15 weight percent of a weak acid catalyst, up to 10 weight percent of a latent catalyst, and up to 15 weight percent of a basic catalyst, said weight percent being the percent by weight of the catalyst free phenolic resin.

2. A catalyst composition of claim 1 in which the polyglycol is selected from polyethylene glycol and polypropylene glycol.

3. A catalyst composition of claim 1 in which the catalyst is sulfuric acid.

4. A catalyst composition of claim 1 in which the catalyst is sodium hydroxide.

5. A catalyst composition of claim 1 which also contains a reactive phenol compatibilizing agent.

* * * * *